(12) United States Patent
Ogihara (10) Patent No.: US 10,160,267 B2
(45) Date of Patent: Dec. 25, 2018

(54) PNEUMATIC TIRE

(71) Applicant: Sumitomo Rubber Industries, Ltd., Kobe-shi, Hyogo (JP)

(72) Inventor: Sawa Ogihara, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 284 days.

(21) Appl. No.: 15/194,893

(22) Filed: Jun. 28, 2016

(65) Prior Publication Data

US 2017/0015144 A1    Jan. 19, 2017

(30) Foreign Application Priority Data

Jul. 13, 2015   (JP) ................................ 2015-139776

(51) Int. Cl.
| | | |
|---|---|---|
| *B60C 11/13* | (2006.01) | |
| *B60C 11/12* | (2006.01) | |
| *B60C 11/03* | (2006.01) | |

(52) U.S. Cl.
CPC ...... *B60C 11/1307* (2013.01); *B60C 11/0306* (2013.01); *B60C 11/0327* (2013.01); *B60C 11/12* (2013.01); *B60C 11/1204* (2013.01); *B60C 11/1236* (2013.01); *B60C 11/1259* (2013.01); *B60C 11/1272* (2013.01);
(Continued)

(58) Field of Classification Search
CPC . B60C 11/0306; B60C 11/0327; B60C 11/12; B60C 11/1204; B60C 11/1236; B60C 11/1259; B60C 11/1272; B60C 11/1307; B60C 2011/0334; B60C 2011/0341; B60C 2011/0348; B60C 2011/0358; B60C 2011/036; B60C 2011/0365; B60C 2011/0367; B60C 2011/0379; B60C 2011/0381; B60C 2011/0383; B60C 2011/1209;
(Continued)

(56) References Cited

U.S. PATENT DOCUMENTS

| | | |
|---|---|---|
| 2011/0024012 A1 | 2/2011 | Iwai |
| 2013/0292021 A1 | 11/2013 | Tanaka |

FOREIGN PATENT DOCUMENTS

| | | | |
|---|---|---|---|
| JP | 2007331412 A | * | 12/2007 |
| JP | 2011-31773 A | | 2/2011 |
| JP | 2013-233822 A | | 11/2013 |

OTHER PUBLICATIONS

JP2007331412A_Machine Translation (Year: 2007).*

* cited by examiner

*Primary Examiner* — Matthew J Daniels
*Assistant Examiner* — Yunju Kim
(74) *Attorney, Agent, or Firm* — Birch, Stewart, Kolasch & Birch, LLP (57) ABSTRACT

A pneumatic tire includes a tread portion provided with a shoulder main groove and a crown main groove to form a middle land portion therebetween. The middle land portion is provided with a first middle lug groove including a first groove wall and a second groove wall, wherein the first groove wall includes a protrusion protruding toward the second groove wall on the side of the shoulder main groove. The protrusion includes a front wall located so as to form a sipe portion between the front wall and the second groove wall, a top wall, a first lateral wall located axially outward of the front wall and a second lateral wall located axially inward of the front wall. The front wall is configured to a triangular shape.

7 Claims, 9 Drawing Sheets

(52) U.S. Cl.
CPC . *B60C 2011/036* (2013.01); *B60C 2011/0334* (2013.01); *B60C 2011/0341* (2013.01); *B60C 2011/0348* (2013.01); *B60C 2011/0358* (2013.01); *B60C 2011/0365* (2013.01); *B60C 2011/0367* (2013.01); *B60C 2011/0379* (2013.01); *B60C 2011/0381* (2013.01); *B60C 2011/0383* (2013.01); *B60C 2011/1209* (2013.01); *B60C 2011/1227* (2013.01); *B60C 2011/1338* (2013.01)

(58) Field of Classification Search
CPC ..... B60C 2011/1227; B60C 2011/1338; B60C 11/125
USPC ..................................................... 152/209.21
See application file for complete search history.

PRIOR ART

FIG.9(B)

PRIOR ART

PNEUMATIC TIRE

BACKGROUND ART

Field of the Invention

The present invention relates to pneumatic tires, and in particular relates to a pneumatic tire being provided with a middle lug groove including a sipe portion formed between a protrusion on a first groove wall and a second groove wall.

Description of the Related Art

Japanese Unexamined Patent Application Publication No. 2011-31773 discloses a pneumatic tire capable of improving wet performance and noise performance in good balance while ensuring steering stability.

The tire includes a tread portion provided with a crown main groove and a shoulder main groove to form a crown rib, a middle rib and a shoulder rib. The middle rib is provided with lug grooves extending from the shoulder main groove to improve drainage property of the middle rib. Furthermore, the middle rib has sufficient rigidity to ensure steering stability in high level since the lug grooves include axially inner ends that terminate within the middle rib. In addition, since the tire prevents that an air compressed between a lug groove and the ground flows into the crown main groove, the pipe resonance generated from the crown main groove, which is a main cause of road noise, can be reduced.

However, since the above mentioned lug grooves include outer ends having a large width, it has been insufficient to prevent reduction of the rigidity of the middle rib. Furthermore, the air compressed by the lug grooves flows into the shoulder main groove to promote the pipe resonance. Therefore, noise reduction effect has also been insufficient.

Figure 9A:
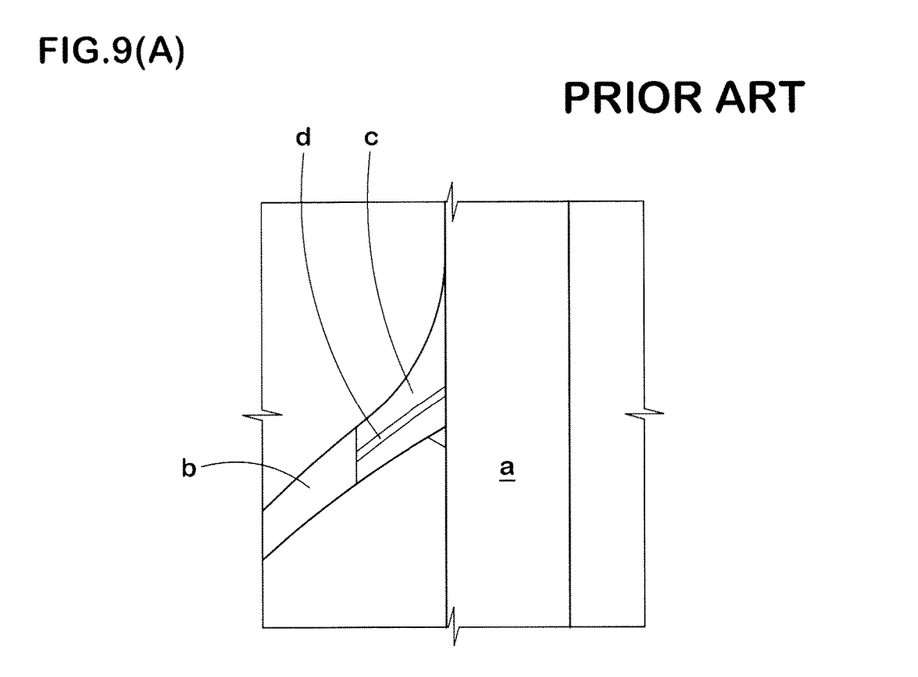
FIGS. 9A and 9B are a plan view and a cross-sectional view respectively each illustrating a conventional tie-bar with a sipe.
Figure 9B:
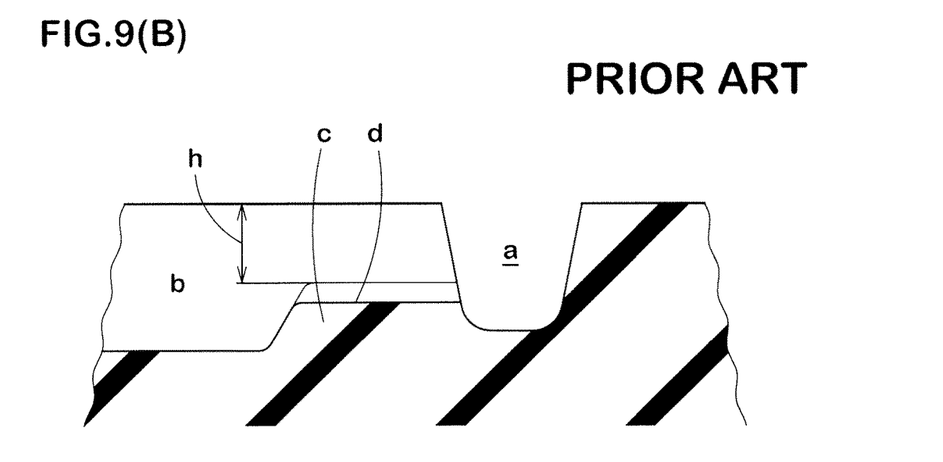

As illustrated in FIGS. 9A and 9B, Japanese Unexamined Patent Application Publication No. 2013-233822 discloses a tire tread provided with a shoulder main groove (a) and a lug groove (b), wherein the lug groove includes a tie-bar (c) provided with a sipe (d). Unfortunately, when a depth (h) of the tie-bar (c) is shallow, sufficient drainage performance cannot be ensured since water would be blocked by the tie-bar. On the other hand, when the depth of the tie-bar (c) is deep, it may be difficult to ensure steering stability and noise performance of the tire. Accordingly, it has been difficult to improve steering stability, wet performance and noise performance at a high level.

SUMMARY OF THE INVENTION

In view of the above problems in the conventional art, the present invention has an object to provide a pneumatic tire capable of improving steering stability, wet performance and noise performance at a high level.

According to one aspect of the invention, a pneumatic tire includes a tread portion having a ground contact surface, the tread portion being provided with a circumferentially extending shoulder main groove arranged proximate to a tread edge and a circumferentially extending crown main groove to form a middle land portion therebetween. The middle land portion is provided with a first middle lug groove extending axially inwardly from the shoulder main groove and terminating within the middle land portion. The first middle lug groove includes a first groove wall and a second groove wall. The first groove wall includes a protrusion protruding toward the second groove wall on the side of the shoulder main groove. The protrusion includes a front wall located so as to form a sipe portion between the front wall and the second groove wall, a top wall, a first lateral wall located axially outward of the front wall and a second lateral wall located axially inward of the front wall. The top wall includes a step surface located radially inward of the ground contact surface of the tread portion and extends in parallel with the ground contact surface of the tread portion. The step surface is configured to a triangular shape including a bottom side on the side of the first groove wall, a vertex (P) protruding the second groove wall, a first oblique side extending from the vertex (P) to an axially outer end of the bottom side and a second oblique side extending from the vertex (P) to an axially inner end of the bottom side. The front wall is configured to a triangular shape including a bottom side extending on a bottom of the first middle lug groove in parallel with the second groove wall, a first oblique side extending from the vertex (p) to an axially outer end of the bottom side and a second oblique side extending from the vertex (P) to an axially inner end of the bottom side. The first lateral wall extends between the first oblique side of the step surface and the first oblique side of the front surface. The second lateral wall extends between the second oblique side of the step surface and the second oblique side of the front surface.

In another aspect of the invention, the first middle lug groove may includes the sipe portion and a remaining lug main portion, and a depth (Da) of the step surface from the ground contact surface of the tread portion may be in a range of from 0.15 to 0.3 times a depth (D0) of the lug main portion.

In another aspect of the invention, the middle land portion may be further provided with an auxiliary sipe extending from an axially inner end of the first middle lug groove and terminating within the middle land portion.

In another aspect of the invention, the middle land portion may be further provided with a bent sipe including a longitudinal portion extending from the first middle lug groove in a circumferential direction of the tire and an inclined portion extending from the longitudinal portion to the crown main groove in parallel with the first middle lug groove.

In another aspect of the invention, the middle land portion may be further provided with a second middle lug groove without having the protrusion.

In another aspect of the invention, the first middle lug groove may include the sipe portion and a remaining lug main portion, and a depth (Db) of the sipe portion may be equal to or less than a depth (D0) of the lug main portion.

As used herein, the tread edge is the axial outermost edge of the ground contacting patch of the tire o each side of the tire equator which occurs under a standard condition with a standard tire load, wherein the standard condition is such that the tire is mounted on a standard wheel rim and is inflated to a standard pressure but loaded with no tire load. As used herein, various dimensions, positions and the like of the tire refer to those under the standard condition of the tire unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

In case of passenger car tires, however, the standard pressure and standard tire load are uniformly defined by 180 kPa and 88% of the maximum tire load, respectively.

DESCRIPTION OF THE PREFERRED EMBODIMENTS

Figure 1:
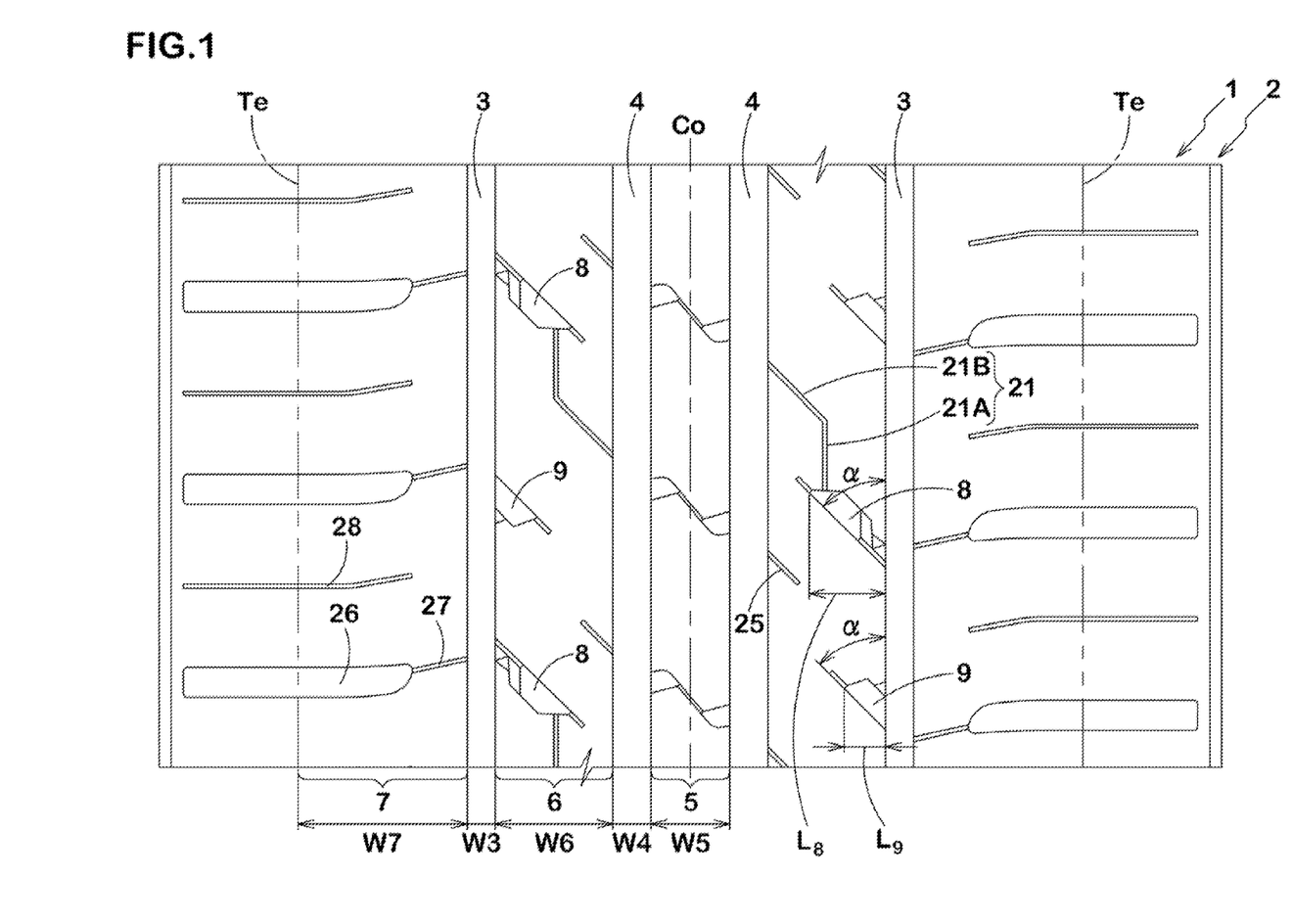
FIG. 1 is a development view of a tread portion of a pneumatic tire according to an embodiment of the present invention.

An embodiment of the present invention will be explained below with reference to the accompanying drawings. As illustrated in FIG. 1, a pneumatic tire 1 in accordance with the present embodiment includes a tread portion 2 provided with a pair of circumferentially extending shoulder main grooves 3 each arranged proximate to each tread edge Te and a pair of circumferentially extending crown main grooves 4 each arranged axially inward of each shoulder main groove 3. Thus, the tread portion 2 in accordance with the embodiment is separated into five land portions that include a central land portion 5 disposed between the crown main grooves 4 and 4, a pair of middle land portions 6 each disposed between the crown main groove 4 and the shoulder main groove 3 on each side of the tire equator Co, and a pair of shoulder land portions 7 each disposed between the shoulder main groove 3 and the tread edge Te on each side of the tire equator Co. Alternatively, a single crown main groove 4 may be provided. In this case, the tread portion 2 may be separated into four land portions that include a pair of middle land portions 6 and a pair of shoulder land portions 7.

In this embodiment, the shoulder main grooves 3 and 3 have the same width and are located apart from the tire equator Co at the same axial distance. Similarly, the crown main grooves 4 and 4 have the same width and are located apart from the tire equator Co at the same axial distance. Furthermore, the central land portion 5, the middle land portions 6 and the shoulder land portions 7 have widths W5, W6 and W7 respectively, wherein the widths satisfy the following relationship:

$W5 <= W6 <= W7$.

In this embodiment, the tread pattern illustrated in FIG. 1 is configured as a substantially point-symmetrical pattern with respect to a point on the tire equator Co except variable pitches.

Widths W3 and W4 of the shoulder main grooves 3 and the crown main grooves 4 respectively and depths thereof are not particularly limited, but may be employed conventional ranges. Preferably, the widths W3 and W4 are in a range of from 2% to 9% of a tread width TW and the depths are in a range of from 7.0 to 10.0 mm, for passenger car tires.

Each middle land portion 6 is provided with a plurality of first middle lug grooves 8 which are spaced in the circumferential direction of the tire. In this embodiment, a second middle lug groove 9 is further provided between circumferentially adjacent first middle lug grooves 8 and 8. Thus, the first middle lug groove 8 and the second middle lug groove 9 are arranged alternately in the circumferential direction of the tire. The first middle lug grooves 8 and second middle lug grooves 9 are inclined in the same direction at an angle α of from 30 to 60 degrees with respect to the circumferential direction of the tire.

Figure 2:
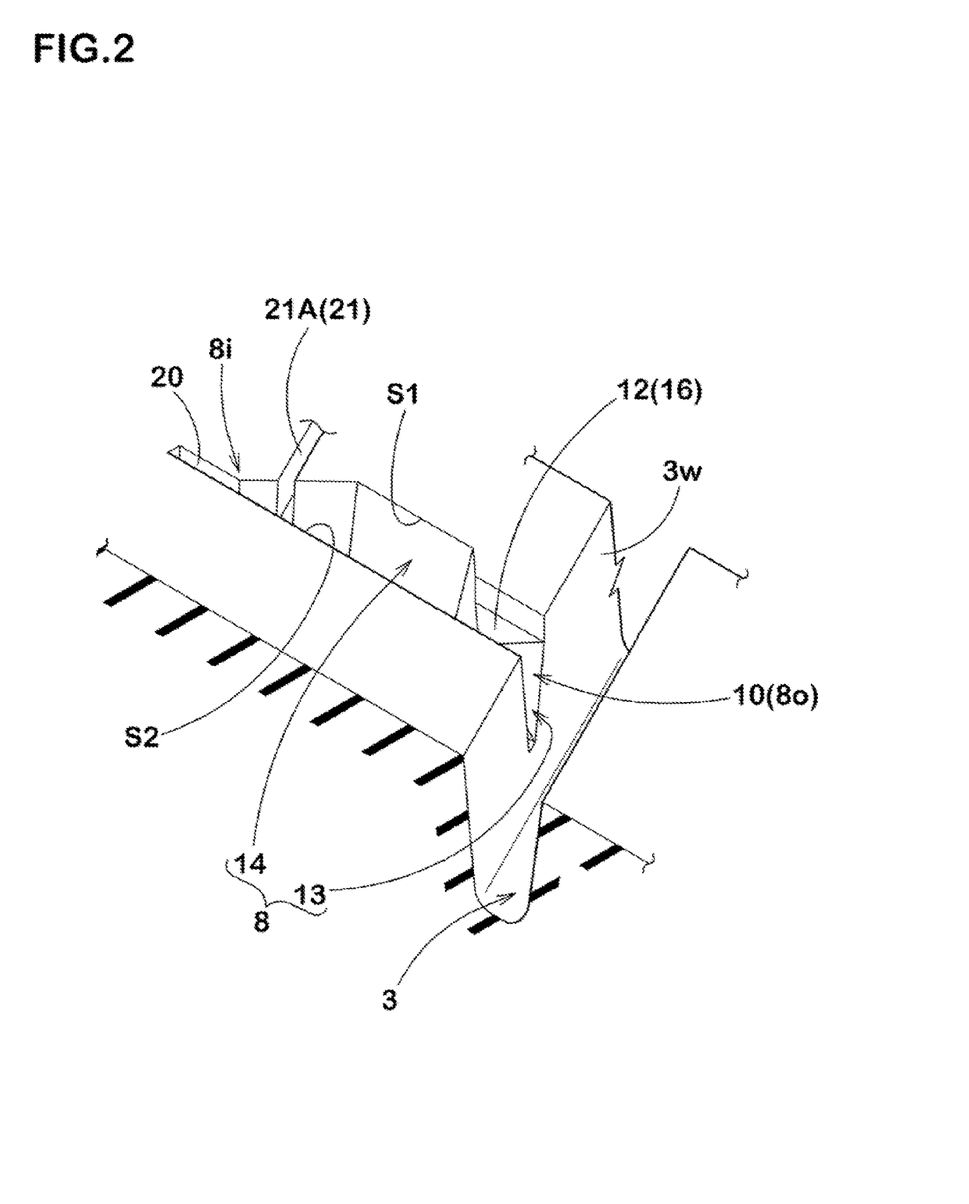
FIG. 2 is a perspective view of a first middle lug groove.
Figure 3A:
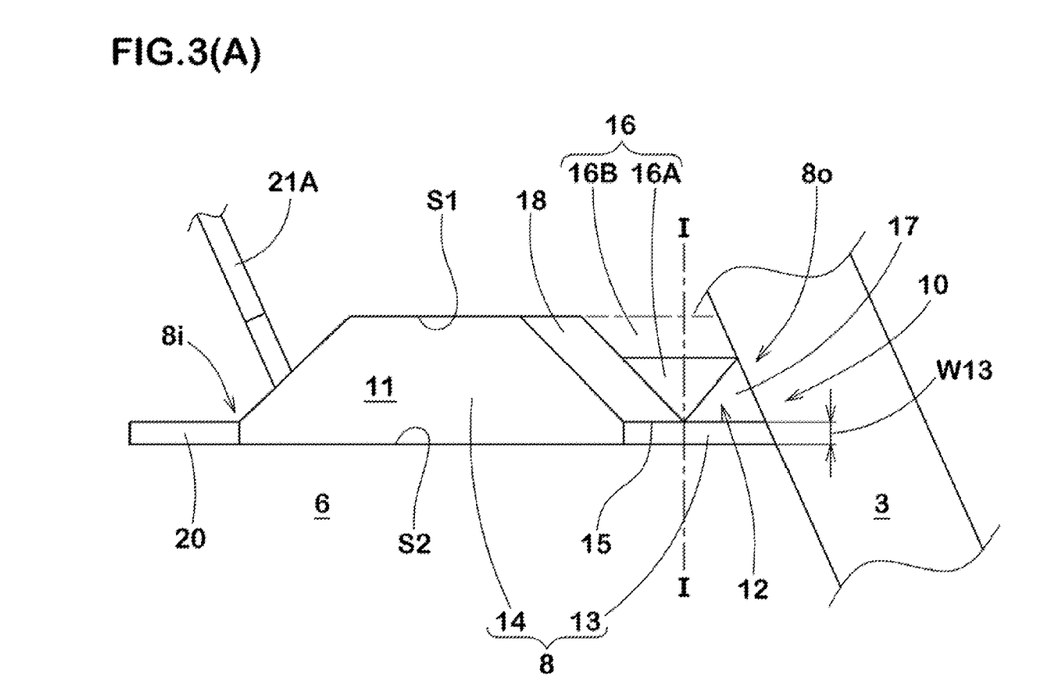
FIG. 3A is a plan view of the first middle lug groove.
Figure 3B:
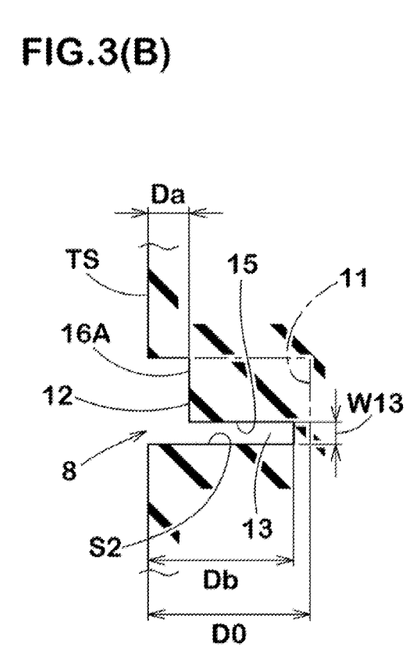
FIG. 3B is a cross-sectional view taken along a line I-I of FIG. 3A.

As illustrated in FIGS. 2 and 3, the first middle lug grooves 8 include axially outer ends 8o in communication with the shoulder main groove 3 and axially inner ends 8i terminating within the middle land portion 6.

Each first middle lug groove 8 includes a first groove wall Si and a second groove wall S2. The first groove wall S1 includes a protrusion 12 protruding toward the second groove wall S2 at an opening 10 on the side of the shoulder main groove 3. The protrusion 12 raises from a groove bottom 11.

The protrusion 12 is provided such that a narrow sipe portion 13 is formed between the protrusion 12 and the second groove wall S2. That is, the first middle lug groove 8 includes the sipe portion 13 and a remaining lug main portion 14. The sipe portion 13 has a width W13 in a range of equal to or less than 1.2 mm same as conventional sipes.

Figure 4:
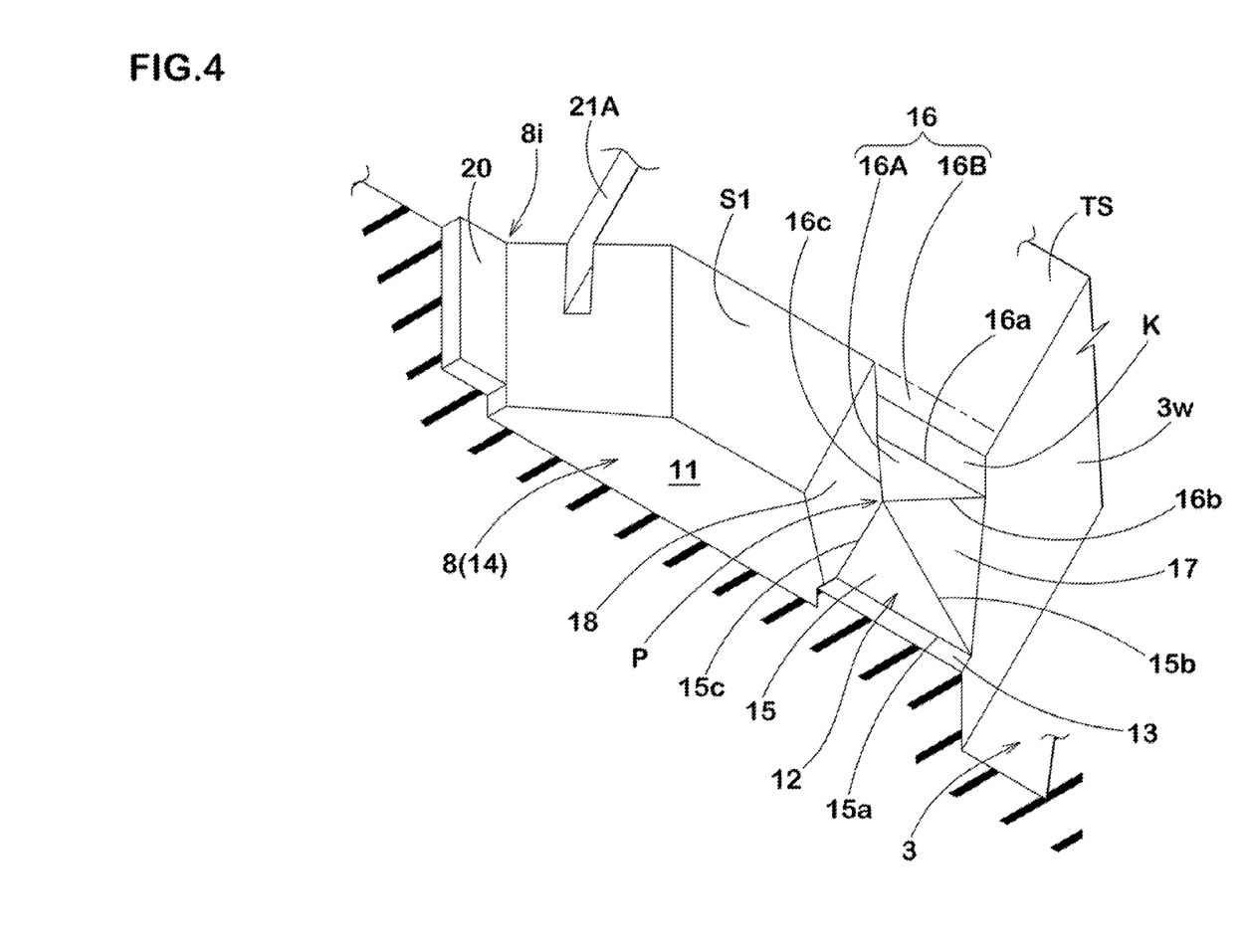
FIG. 4 is a partial perspective view illustrating a first groove wall of with a protrusion of the first middle lug groove.

As illustrated in FIGS. 3 and 4, the protrusion 12 includes a front wall 15 located to form the sipe portion 13 between the front wall 15 and the second groove wall S2, a top wall 16, a first lateral wall 17 located axially outward of the front wall 15 and a second lateral wall 18 located axially inward of the front wall 15. The top wall 16 includes a step surface 16A located radially inward of the ground contact surface TS of the tread portion 2 and extending in parallel with the ground contact surface TS of the tread portion 2. In this embodiment, the top wall 16 includes a sub portion 16B constituting a part of the ground contact surface TS and the step surface 16A connected to the sub portion 16B through a step K.

The step surface 16A is configured to a substantially triangular shape that includes a bottom side 16a on the side of the first groove wall S1, a vertex (P) protruding toward the second groove wall S2, a first oblique side 16b extending from the vertex (P) to an axially outer end of the bottom side 16a and a second oblique side 16c extending from the vertex (P) to an axially inner end of the bottom side 16a. Preferably, the bottom side 16a extends in parallel with the first groove wall S1. Note that the above-mentioned "substantially triangular shape" refers to as not only a triangular shape in which the first and second oblique sides 16b and 16c extend from the vertex (P) to the axially outer and inner ends of the bottom side 16a respectively but also an imperfect triangular shape in which a part J1 of the triangular shape is cut on the side of the shoulder main groove 3 or the sipe portion 13, as illustrated in FIGS. 6A, 6B, 7A and 7C. In case of the former, the vertex (P) is preferably located on the perpendicular bisector of the bottom side 16a. In the latter case, the vertex (P) is preferably located on the perpendicular bisector of the bottom side 16a in a shape before being cut the part J1.

Referring back to FIG. 4, the front wall 15 is configured to a substantially triangular shape that includes a bottom side 15a extending on a bottom 11 of the first middle lug groove 8 in parallel with the second groove wall S2, a first oblique side 15b extending from the vertex (P) to an axially outer end of the bottom side 15a and a second oblique side 15c extending from the vertex (P) to an axially inner end of the bottom side 15a. The front wall 15 extends substantially in parallel with the second groove wall S2. Note that the above-mentioned "substantially triangular shape" refers to as not only a triangular shape in which the first and second oblique sides 15b and 15c extend from the vertex (P) to the axially outer and inner ends of the bottom side 15a respectively but also an imperfect triangular shape in which a part J2 of the triangular shape is cut on the side of the shoulder main groove 3 or the sipe portion 13, as illustrated in FIGS. 6A, 6B, 7A and 7C. In case of the former, the vertex (P) is preferably located on the perpendicular bisector of the bottom side 15a. In the latter case, the vertex (P) is preferably located on the perpendicular bisector of the bottom side 15a in a shape before being cut the part J2.

The first lateral wall 17 intersects with a groove wall 3w of the shoulder main groove 3. Furthermore, the first lateral wall 17 intersects with the step surface 16A at the first oblique side 16b, and intersects with the front wall 15 at the first oblique side 15b. In this embodiment, the first lateral wall 17 is configured as a triangular shape. The second lateral wall 18 intersects with the first groove wall S1. Furthermore, the second lateral wall 18 intersect with the step surface 16A at the second oblique side 16c, and intersects with the front wall 15 at the second oblique side 15c. In this embodiment, the front wall 15, the step surface 16A, the first lateral wall 17 and the second lateral wall 18 are configured as a plane.

Preferably, a depth (Da) of the step surface 16A from the ground contact surface TS of the tread portion 2 is in a range of from 0.15 to 0.3 times a depth (D0) of the lug main portion 14 as illustrated in FIG. 3B. When the depth (Da) is less than 0.15 times the depth (D0), drainage performance may be lowered. On the other hand, when the depth (Da) is more than 0.3 times the depth (D0), steering stability of the tire may be lowered. Furthermore, a depth (Db) of the sipe portion 13 from the ground contact surface TS of the tread portion 2 is preferably equal to or less than the depth (D0) of the lug main portion 14. More preferably, the depth (Db) is in a range of from 0.70 to 0.95 times the depth (D0).

The protrusion 12 may increase rigidity of a portion around the middle lug groove 8 on the side of the opening 10, and thus improves steering stability of the tire. Furthermore, the protrusion 12 may prevent inflow of an air compressed by the middle lug groove 8 to the shoulder main groove 3 to improve noise performance. In addition, wet performance of the tire can be ensured since water introduced in the middle lug groove 8 is drained toward the shoulder main groove 3 through the sipe portion 13 and the step surface 16A.

Each of the step surface 16A and the front wall 15 is configured as a triangular shape, and the second lateral wall 18 is formed into an oblique plane including the second oblique sides 15c and 16c. That is, the second lateral wall 18 is inclined so as to approach the step surface 16A and the sipe portion 13 to the axially outwardly. This configuration would smoothly guide water introduced in the middle lug groove 8 to the shoulder main groove 3 through the sipe portion 13 as well as a space between the step surface 16A and the ground while ensuring noise performance to improve drainage performance.

Furthermore, since the first lateral wall 17 is also formed into an oblique plane including the first oblique sides 15b and 16b, the protrusion 12 is configured as a quadrangular pyramid shape having the front wall 12 increasing its width toward the bottom 11 and the top wall increasing its width toward the first groove wall S1. This configuration of the protrusion 12 may have high rigidity to improve steering stability while offering better drainage of the sipe portion 13 as compared with a tie-bar formed as a rectangular parallelepiped shape.

In this embodiment, an auxiliary sipe 20 is provided on the middle land portion to further improve drainage performance while ensuring the rigidity, wherein the auxiliary sipe 20 extends axially inwardly from the axially inner end 8i of each first middle lug groove 8.

The auxiliary sipe 20 extends substantially in parallel with the middle lug groove 8 and has an axially inner end terminating within the middle land portion 6. As illustrated in FIG. 1, the middle land portion 6 is further provided with a bent sipe 21. The bent sipe 21 includes a longitudinal portion 21A extending from the first middle lug groove 8 in the circumferential direction of the tire and an inclined portion 21B extending from the longitudinal portion 21A to the crown main groove in parallel with the first middle lug groove 8. The longitudinal portion 21A extends on or around the axially center of the middle land portion 6. Preferably, the longitudinal portion 21A may be located within 10% of a width W6 of the middle land portion 6 from the axially center.

Figure 5A:
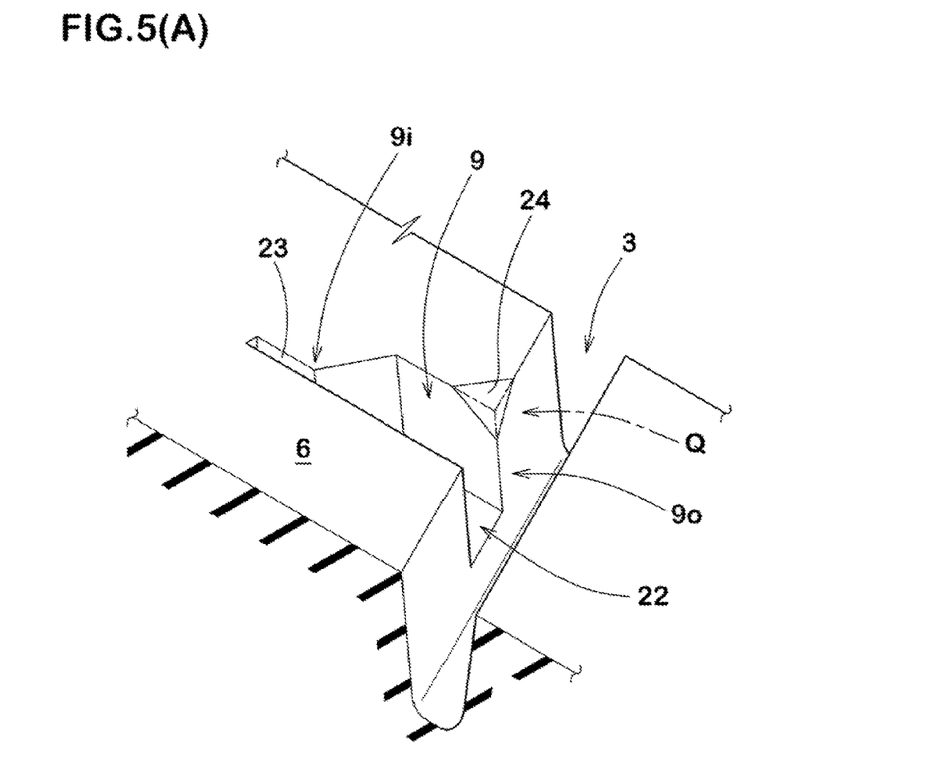
FIG. 5A is a perspective view of a second middle lug groove.
Figure 5B:
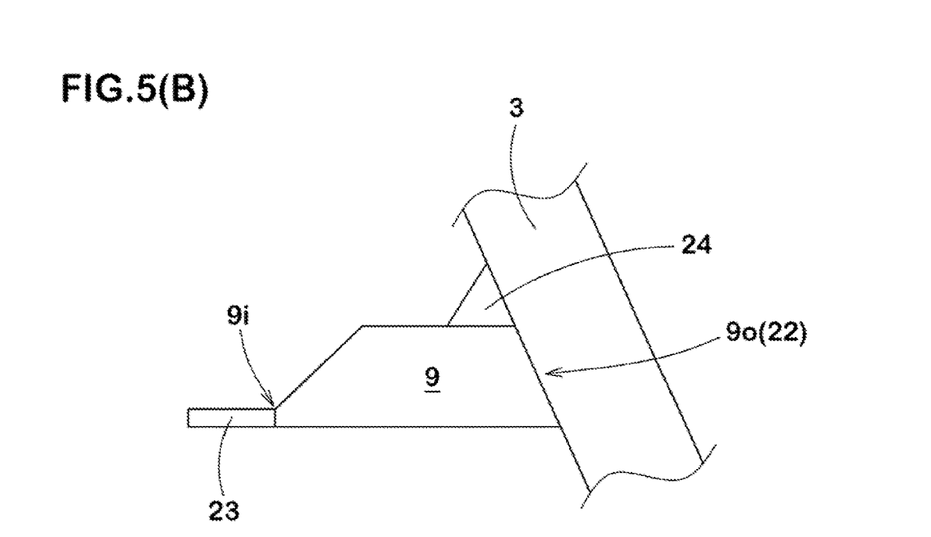
FIG. 5B is a plan view thereof.

As illustrated in FIGS. 5A and 5B, the second middle lug groove 9 includes an axially outer end 9o that opens at the shoulder main groove 3 and an axially inner end 9i that terminates within the middle land portion 6. The middle lug groove 9 has no protrusions 12 on the side of the opening 22, and extends in parallel with the middle lug groove 8 with a width same as the lug main portion 14 of the first middle lug groove 8. Furthermore, the axially inner end of the second middle lug groove 9 is connected to an auxiliary sipe 23 which is similar to the auxiliary sipe 20. As illustrated in FIG. 1, the second middle lug groove 9 has an axial length $L_9$ which is smaller than an axial length $L_8$ of the first middle lug groove 8, and preferably the length $L_9$ is 40% to 60% of the length $L_8$. In this embodiment, an acute corner Q between the second middle lug groove 9 and the shoulder main groove 3 is configured as a triangular chamfered portion 24 to prevent the corner Q from chipping.

As illustrated in FIG. 1, the middle land portion 6 is further provided with a plurality of second auxiliary sipes 25 extending axially outwardly from the crown main groove 4 and terminating within the middle land portion 6. In this embodiment, the second auxiliary sipes 25 extend in parallel with the inclined portion 21B of the bent sipe 21. The auxiliary sipes 25 and the inclined portions 21B are arranged alternately in the circumferential direction of the tire so that pattern rigidity of the middle land portion 6 is uniformized. The respective acute corners formed between the auxiliary sipes 25 and the crown main groove 4 as well as between the inclined portion 21B and the crown main groove 4 are chamfered in a triangular shape to prevent these corners from chipping (not illustrated).

The shoulder land portions 7 is provided with a plurality of shoulder lug grooves 26 that extend axially inwardly from a location axially outside the tread edge Te and have axially inner ends terminating within the shoulder land portions 7, and a plurality of auxiliary sipes 27 that extend from the axially inner ends of the shoulder lug grooves 26 to the shoulder main groove 3, for example. In this embodiment, a sipe 28 is provided between circumferentially adjacent shoulder lug grooves 26 and 26, wherein the sipe 28 extends axially inwardly from a location axially outside the tread edge Te and terminating within the shoulder land portions 7. The sipe 28 extends substantially in parallel with the shoulder lug grooves 26. Furthermore, the shoulder lug grooves 26 and the sipe 28 have an angle 90 degrees plus/minus 10 degrees with respect to the circumferential direction of the tire at the tread edge Te.

Figure 6A:
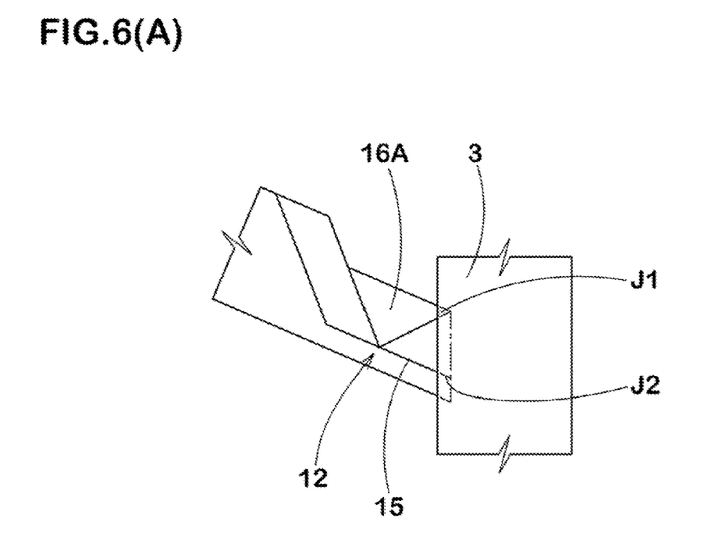
FIGS. 6A and 6B are a plan view and a perspective view respectively each illustrating the protrusion in accordance with another embodiment of the invention.
Figure 6B:
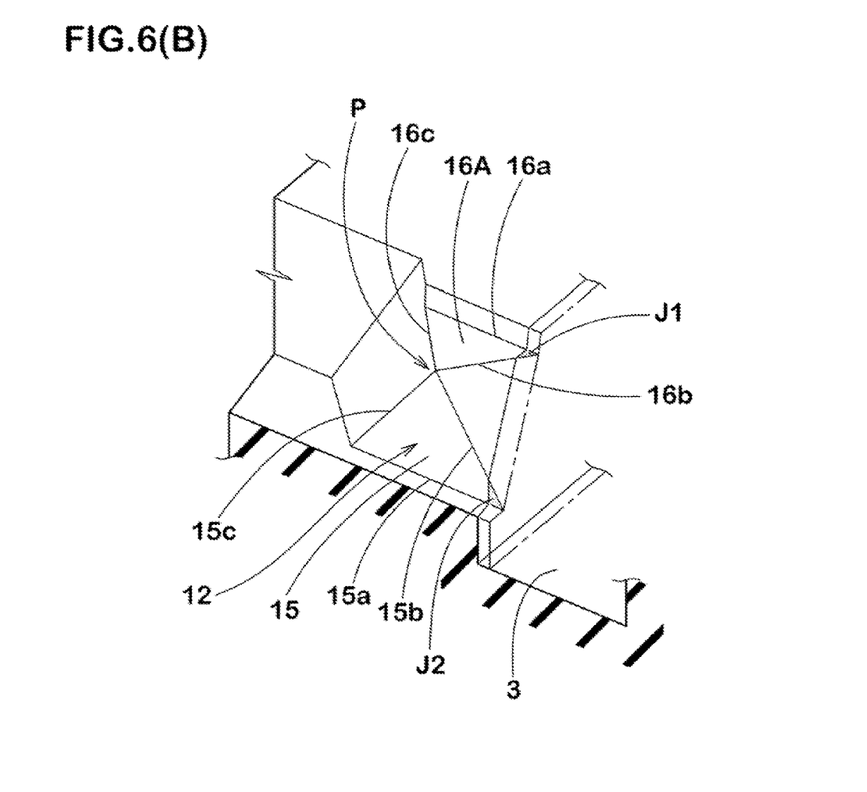

FIGS. 6A and 6B illustrate a plan view and a perspective view respectively each illustrating the protrusion 12 in accordance with another embodiment of the invention. In this embodiment, the step surface 16A and the front wall 15 are formed into a substantially triangular shape (e.g. imperfect triangular shape). Specifically, the step surface 16A is exemplified as a substantially triangular shape which is deficient in a small part J1 on the side of the shoulder main groove 3 with respect to a reference triangular shape imaginary formed by the bottom side 16a, the first oblique side 16b and the second oblique side 16c.

Similarly, the front wall 15 is exemplified as a substantially triangular shape which is deficient in a small part J2 on the side of the shoulder main groove 3 with respect to a reference triangular shape imaginary formed by the bottom side 15a, the first oblique side 15b and the second oblique side 15c. In any case, a deficient area of a substantially triangular shape is preferably less than 15%, more preferably less than 10% of the reference triangular shape. Such a protrusion 12 may also exert the same effects as the protrusion 12 described above in which both the step surface 16A and the front wall 15 have a reference triangular shape.

Note that the depth (Db) of the sipe portion 13 may be set same as the depth (D0) of the lug main portion 14.

Figure 7A:
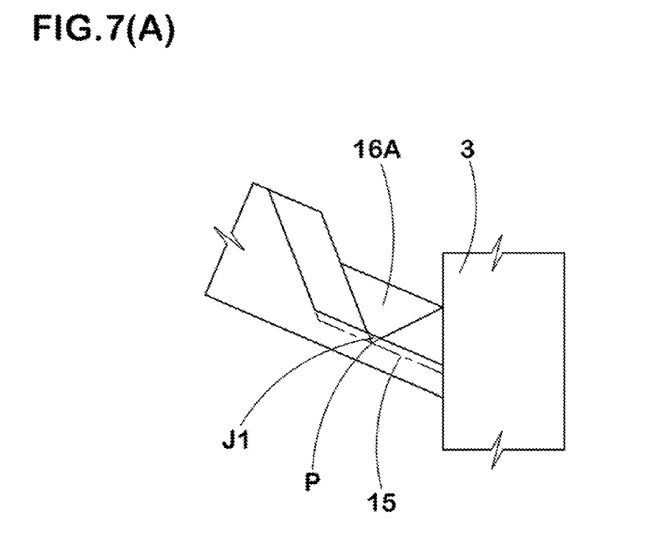
FIGS. 7A and 7B are a plan view and a perspective view respectively each illustrating the protrusion in accordance with yet another embodiment of the invention.
Figure 7B:
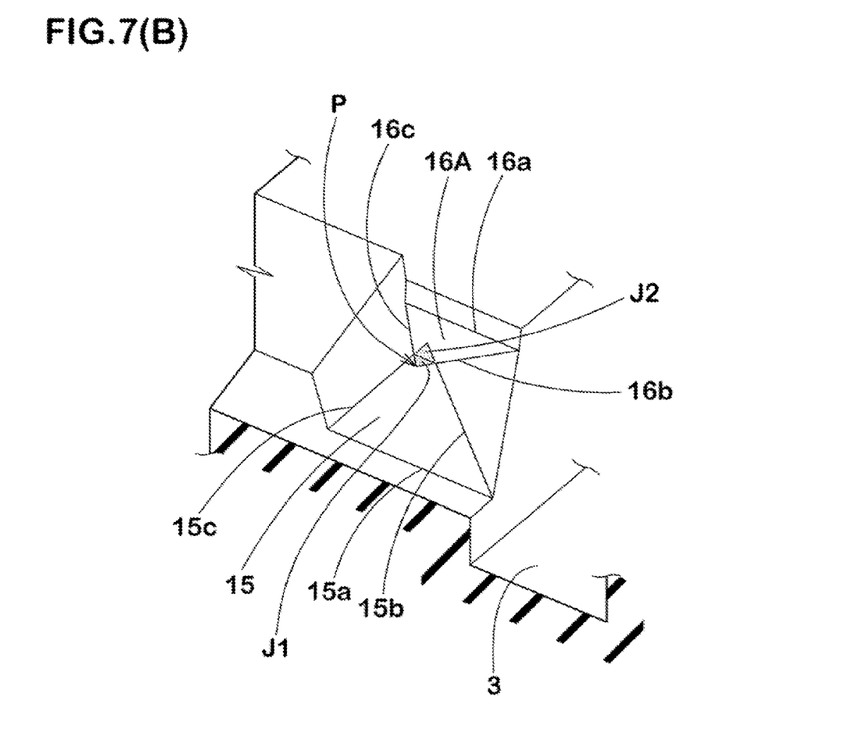

FIGS. 7A and 7B illustrate a plan view and a perspective view of another embodiment of the protrusion respectively, wherein the step surface 16A and the front wall 15 are formed into a substantially triangular shape. Specifically, the step surface 16A is exemplified as a substantially triangular shape which is deficient in a small part J1 on the side of the vertex (P) with respect to a reference triangular shape imaginary formed by the bottom side 16a, the first oblique side 16b and the second oblique side 16c. In this embodiment, the step surface 16A having the substantially triangular shape may be similar to a trapezoidal shape. Similarly, the front wall 15 is also exemplified as a substantially triangular shape which is deficient in a small part J2 on the side of the vertex (P) with respect to a reference triangular shape imaginary formed by the bottom side 15a, the first oblique side 15b and the second oblique side 15c. In this embodiment, the front wall 15 having the substantially triangular shape may be similar to a trapezoidal shape. In any case, a deficient area of a substantially triangular shape is preferably less than 15 %, more preferably less than 10% of the reference triangular shape. Such a protrusion 12 may also exert the same effects as the protrusion 12 described above in which both the step surface 16A and the front wall 15 have a reference triangular shape.

Figure 8A:
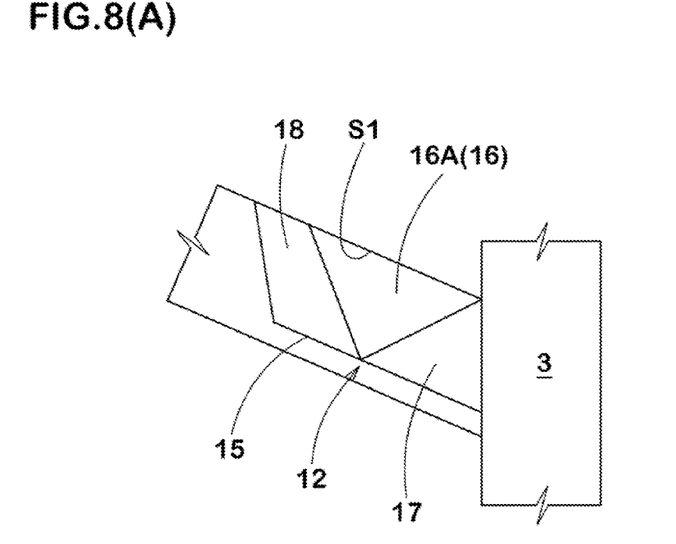
FIGS. 8A and 8B are a plan view and a perspective view respectively each illustrating the protrusion in accordance with yet another embodiment of the invention.
Figure 8B:
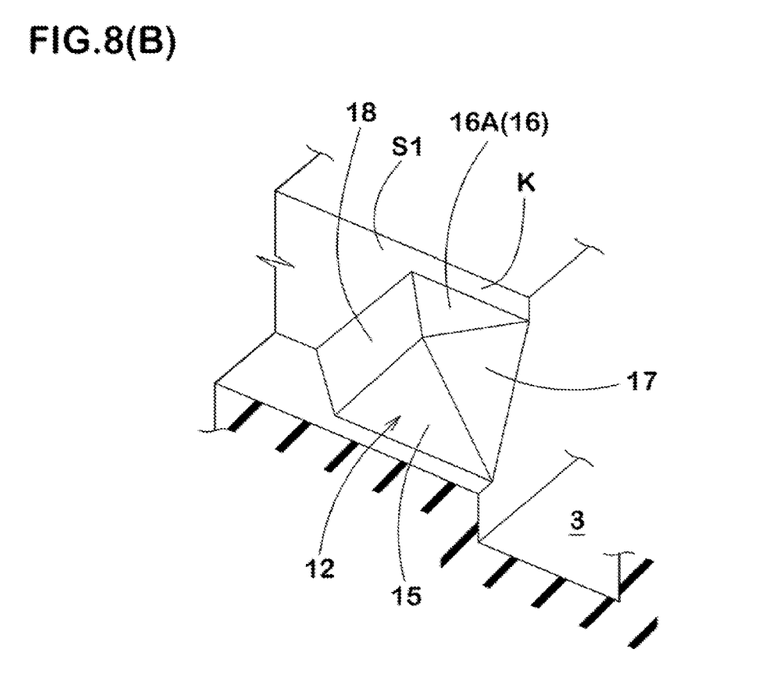

FIGS. 8A and 8B illustrate a plan view and a perspective view of the protrusion 12 respectively in accordance with yet another embodiment of the invention. In this embodiment, the top wall 16 is configured by only the step surface 16A, and the sub portion 16B is not provided.

While the particularly preferable embodiments in accordance with the present invention have been described in detail, the present invention is not limited to the illustrated embodiments, but can be modified and carried out in various aspects.

EXAMPLE

In order to confirm the effects of the invention, passenger car tires (195/65R15) having a basic tread pattern illustrated in FIG. 1 were manufactured based on the detail shown in Table 1. Then, noise performance, wet performance and steering stability of each test tire was tested. Note that the tire of Ref 1 had no protrusions on the middle lug groove and the tire of Ref 2 was provided with a tie-bar with a groove bottom sipe on the middle lug groove 8 at its opening 10 as illustrated in FIGS. 9A and 9B. Each tire has substantially same specification except the detail as shown in Table 1. Common specification and test method are as follows:
Common specification:
   Protrusion
      Step surface shape: triangle
      Front wall shape: triangle
      Step surface depth Da: 1.5 mm
   Sipe portion depth Db: 5.3 mm
   Lug main portion depth D0: 6.0 mm
   Auxiliary sipe width: 0.8 mm
   Bent sipe width: 0.8 mm
Noise performance test:

Each test tire mounted on a rim (15×6JJ) with an inner pressure (230 kPa) and was installed to a front wheel drive test vehicle having a displacement of 1800cc as its all wheels, and then a driver drove the test vehicle on a noise measurement road with a rough asphalt surface at speed of 60 km/h to evaluate a car interior noise by his sense. The test results are shown with an index base on Ref 1 being 100. The larger the value, the better the performance is.
Wet Performance Test:

The above-mentioned test vehicle was entered into a course with a water puddle of 5 mm deep and 20 m long, on an asphalt road surface with a radius of 100 m, with stepwise speed increase. Then, lateral acceleration (lateral G) of the test vehicle was measured, and average lateral at speeds of 50 to 80 km/h was calculated. The test results are shown with an index base on Ref. 1 being 100. The larger the value, the better the performance is.
Steering Stability Test:

The driver drove the above mentioned test vehicle on a tire test course with a dry asphalt surface to evaluate the steering stability by his sense. The test results are shown with an index base on Ref. 1 being 100. The larger the value, the better the performance is.

As shown in Table 1, it is confirmed that the tire, which has the protrusion in which both the step surface and the front wall are configured as a triangular shape, exerts excellent steering stability, wet performance and noise performance at a high level, as compared with the tire of Ref 2 having a tie-bar with a sipe.

TABLE 1

| | Ref. 1 | Ref. 2 | Ex. 1 | Ex. 2 | Ex. 3 | Ex. 4 |
|---|---|---|---|---|---|---|
| Tread pattern | FIG. 1 | | | | | |
| Middle lug groove | Presence | | | | | |
| Protrusion | Absence | Tie-bar | Presence | | | |
| Step surface | Absence | | | Presence (triangular shape) | | |
| Front wall | Absence | | | Presence (triangular shape) | | |
| Sipe portion | Absence | Sipe | Presence | | | |
| Auxiliary sipe | Absence | Absence | Absence | Presence | Presence | Absence |
| Bent sipe | Absence | Absence | Absence | Presence | Presence | Absence |
| Second middle lug groove | Absence | Absence | Absence | Absence | Presence | Presence |
| Noise performance | 100 | 110 | 110 | 110 | 110 | 110 |
| Wet performance | 100 | 90 | 97 | 105 | 110 | 108 |
| Steering stability | 100 | 107 | 110 | 110 | 110 | 110 |
| (TOTAL) | 300 | 307 | 317 | 325 | 330 | 328 |

What is claimed is:

1. A pneumatic tire comprising:
   a tread portion having a ground contact surface, the tread portion being provided with a circumferentially extending shoulder main groove arranged proximate to a tread edge and a circumferentially extending crown main groove to form a middle land portion therebetween;
   the middle land portion being provided with a first middle lug groove extending axially inwardly from the shoulder main groove and terminating within the middle land portion;
   the first middle lug groove comprising a first groove wall and a second groove wall, the first groove wall comprising a protrusion protruding toward the second groove wall on the side of the shoulder main groove;
   the protrusion comprising a front wall located so as to form a sipe portion between the front wall and the second groove wall, a top wall, a first lateral wall located axially outward of the front wall and a second lateral wall located axially inward of the front wall; and
   the top wall comprising a step surface located radially inward of the ground contact surface of the tread portion and extending in parallel with the ground contact surface of the tread portion, the step surface configured to have a triangular shape comprising a bottom side on the side of the first groove wall, a vertex (P) protruding the second groove wall, a first oblique side extending from the vertex (P) to an axially outer end of the bottom side and a second oblique side extending from the vertex (P) to an axially inner end of the bottom side.

2. The pneumatic tire according to claim 1,
   wherein the first middle lug groove comprises the sipe portion and a remaining lug main portion, and
   a depth (Da) of the step surface from the ground contact surface of the tread portion is in a range of from 0.15 to 0.3 times a depth (D0) of the lug main portion.

3. The pneumatic tire according to claim 1,
   wherein the middle land portion is further provided with an auxiliary sipe extending from an axially inner end of the first middle lug groove and terminating within the middle land portion.

4. The pneumatic tire according to claim 1,
   wherein the middle land portion is further provided with a bent sipe comprising a longitudinal portion extending from the first middle lug groove in a circumferential direction of the tire and an inclined portion extending from the longitudinal portion to the crown main groove in parallel with the first middle lug groove.

5. The pneumatic tire according to claim 1,
   wherein the middle land portion is further provided with a second middle lug groove without having the protrusion.

6. The pneumatic tire according to claim 1,
   wherein the first middle lug groove comprises the sipe portion and a remaining lug main portion, and
   a depth (Db) of the sipe portion is equal to or less than a depth (D0) of the lug main portion.

7. A pneumatic tire comprising:
   a tread portion having a ground contact surface, the tread portion being provided with a circumferentially extending shoulder main groove arranged proximate to a tread edge and a circumferentially extending crown main groove to form a middle land portion therebetween;
   the middle land portion being provided with a first middle lug groove extending axially inwardly from the shoulder main groove and terminating within the middle land portion;
   the first middle lug groove comprising a first groove wall and a second groove wall, the first groove wall comprising a protrusion protruding toward the second groove wall on the side of the shoulder main groove;
   the protrusion comprising a front wall located so as to form a sipe portion between the front wall and the second groove wall, a top wall, a first lateral wall located axially outward of the front wall and a second lateral wall located axially inward of the front wall;
   the top wall comprising a step surface located radially inward of the ground contact surface of the tread portion and extending in parallel with the ground contact surface of the tread portion, the step surface configured to have a triangular shape comprising a bottom side on the side of the first groove wall, a vertex (P) protruding the second groove wall, a first oblique side extending from the vertex (P) to an axially outer end of the bottom side and a second oblique side extending from the vertex (P) to an axially inner end of the bottom side;
   the front wall configured to have a triangular shape comprising a bottom side extending on a bottom of the first middle lug groove in parallel with the second groove wall S2, a first oblique side extending from the vertex (p) to an axially outer end of the bottom side and a second oblique side extending from the vertex (P) to an axially inner end of the bottom side;
   the first lateral wall extending between the first oblique side of the step surface and the first oblique side of the front wall; and the second lateral wall extending between the second oblique side of the step surface and the second oblique side of the front wall.

\* \* \* \* \*